Sept. 29, 1925.  
S. G. RUSSELL  
1,555,029  
METHOD OF FINISHING ARTIFICIAL FISH BAITS OR LURES  
Filed Sept. 23, 1922   2 Sheets-Sheet 2
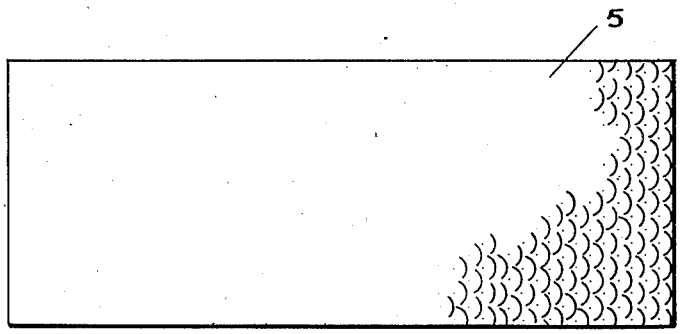
Fig. IX.
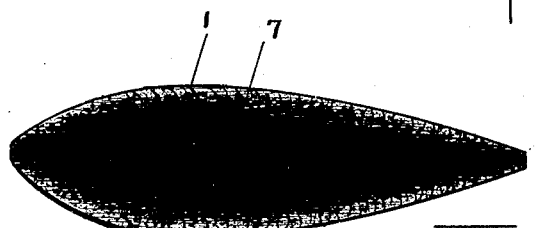
Fig. VIII.
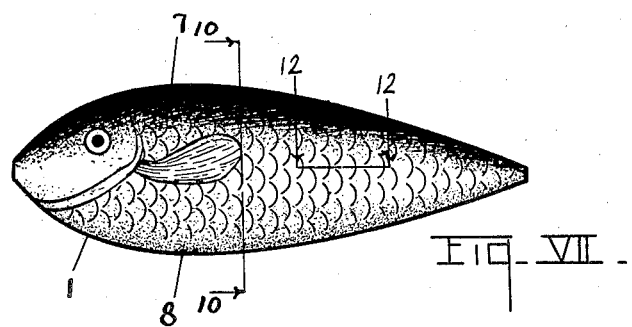
Fig. VII.
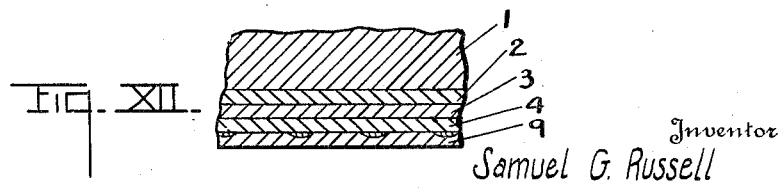
Fig. XII.
Inventor  
Samuel G. Russell
By Chappell Earl  
Attorneys Patented Sept. 29, 1925.

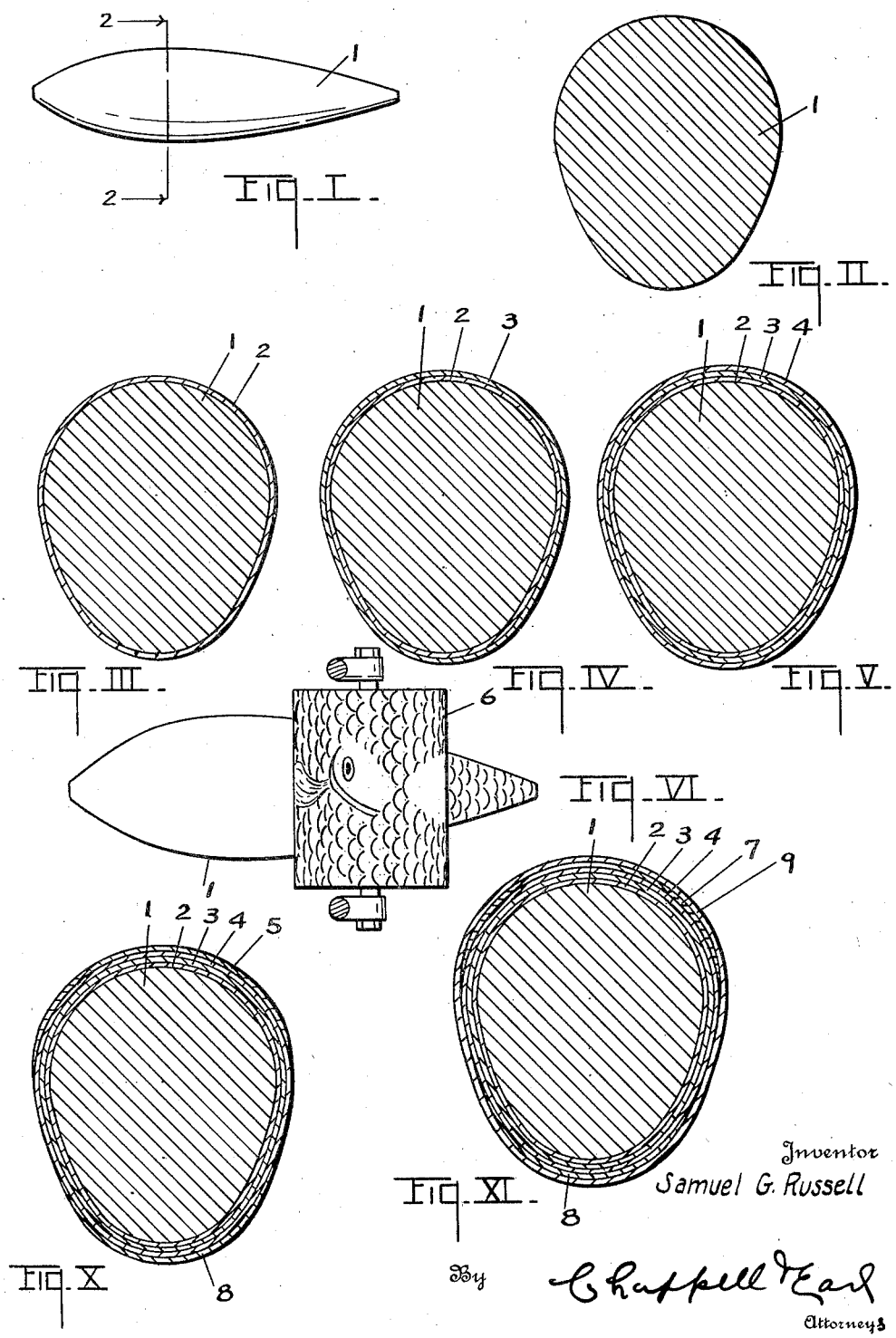

1,555,029

UNITED STATES PATENT OFFICE.

SAMUEL G. RUSSELL, OF KALAMAZOO, MICHIGAN, ASSIGNOR TO SHAKESPEARE COMPANY, OF KALAMAZOO, MICHIGAN.

METHOD OF FINISHING ARTIFICIAL FISH BAITS OR LURES.

Application filed September 23, 1922. Serial No. 590,076.

*To all whom it may concern:*

Be it known that I, SAMUEL G. RUSSELL, a citizen of the United States, residing at the city and county of Kalamazoo, State of Michigan, have invented certain new and useful Improvements in Methods of Finishing Artificial Fish Baits or Lures, of which the following is a specification.

This invention relates to improvements in methods of finishing artificial baits or lures.

The main object of this invention is to provide an improved method of ornamenting baits or lures by the practice of which the external appearance of a fish, frog, crab, insect or other live bait can be effectively imitated.

A further object is to provide an improved method of finishing artificial baits or lures having the above advantages by means of which the baits may be effectively and economically finished.

A still further object is to provide an improved method of finishing artificial baits or lures which enables effective representation of scales, fins, gills and the like and the close imitation of various species or kinds of fish or other live baits.

In the accompanying drawing I illustrate several steps of my improved method, the purpose being to enable the practice thereof in a satisfactory manner.

Fig. I is a side view of a bait or lure in its unfinished state.

Fig. II is a cross section thereof on a line coresponding to line 2—2 of Fig. I.

Fig. III is a cross section corresponding to Fig. II with the filling coating applied thereto.

Fig. IV is a cross section corresponding to that of Fig. III with the foundation coating applied over the filling coating.

Fig. V is a similar cross section with the background coating applied.

Fig. VI is a side elevation of the bait body and the transfer roller illustrating the step of applying the design.

Fig. VII is a side elevation of the bait body after the design has been printed or transferred thereon, and the back and bottom, or unprinted areas, colored and blended into the printed areas.

Fig. VIII is a top or back view of the bait or lure.

Fig. IX is a plan view illustrating the design upon the plate from which it is transferred to the bait body.

Fig. X is a vertical cross section on a line corresponding to line 10—10 of Fig. VII illustrating the addition of the top and bottom coloring, or the coloring of the unprinted surfaces.

Fig. XI is a corresponding transverse section illustrating the body with a final transparent water resisting coating thereon.

Fig. XII is an enlarged detail section on a line corresponding to line 12—12 of Fig. VII illustrating the design in relation to the other coatings.

In the drawing similar numerals of reference indicate similar parts throughout the several views.

In the accompanying drawing it will be understood that the parts are shown conventionally and thick coatings are illustrated as a matter of convenience. The bait bodies 1 are formed of suitable material such as red cedar and they are first coated with a filling coating 2 of enamel, paint or other suitable material. A body or foundation coating 3 is then applied, this being preferably formed of several coatings of white enamel to produce a smooth substantial body for the design.

I then apply a coating 4 of colored material or material which is to be the basic color of the scales. This may be silver, gold, bronze or any other other color desired. The design is then printed upon the bait body by means of the transfer process, this being accomplished by forming the design upon a block or plate 5 similar to an electro wood cut or the like. The plate is then inked or colored. This may be done with an ordinary printers' roller or by spraying with an air brush or hand brush. After the plate is properly inked or colored the design is transferred by proper application to a roller or suitable pad 6 of resilient material which, when pressed or rolled on the surface of the bait, conforms to the unequally curved surface thereof, transferring the design to the bait. In the structure illustrated, scales, fins, gills and eyes are represented but these may be as desired to represent external parts of a fish. The scales are conventionally illustrated in the drawing, although in practice they are reproduced with as much refinement as desired, the conventional illustration being here employed for convenience.

The top and bottom areas 7 and 8 are then colored as indicated in Figs. VII, VIII, X and XI to properly imitate these portions of the minnow which it is desired to imitate and to blend the edges of the printed areas therewith. This may be effectively done by means of an air brush and the printed areas may be effectively tinted as desired. The bait is then provided with a final coating 9 of transparent water resisting material.

By this method I am able to very effectively imitate various kinds of fish, minnows or other live baits representing their dominating external characteristics and coloring and this may be done very rapidly and economically.

I have illustrated in the accompanying drawing one practical means of practicing my invention. One of the advantages of my invention, however, is its great range and adaptability for producing baits with a variety of attractive designs, the designs possible being almost unlimited.

Having thus described my improvements, what I claim as new and desire to secure by Letters Patent is:

1. The method of finishing artificial baits or lures with a design representing external parts of the live bait imitated consisting of applying filling and foundation coats thereto providing a continuously coated smooth surface, applying to such foundation coating a background constituting the basic color of the design, transfer printing the design on such background coating, and finishing with a transparent water resisting coating.

2. The method of finishing artificial baits or lures with a design representing external parts of the live bait imitated consisting of applying a foundation coating thereto, applying upon such foundation coating a background coating constituting the basic color of the design, transfer printing the design on such background coating by means of a resilient transfer member which conforms to the shape of the bait, tinting the printed areas and blending such areas with the unprinted areas, and finishing with a transparent water resisting coating.

3. The method of finishing artificial baits or lures with a design representing external parts of the live bait imitated consisting of applying a background coating constituting the basic color of the design, transfer printing the design on such background coating by means of a resilient transfer member which conforms to the shape of the bait, blending the printed areas with the unprinted areas, and finishing with a transparent water resisting coating.

4. The method of finishing artificial baits or lures with a design representing external parts of the live bait imitated consisting of applying a background coating constituting the basic color of the design, transfer printing the design on such background coating blending the printed areas with the unprinted areas, and finishing with a transparent water resisting coating.

In witness whereof, I have hereunto set my hand.

SAMUEL G. RUSSELL.